(12) United States Patent
Choi et al.

(10) Patent No.: US 11,563,794 B1
(45) Date of Patent: Jan. 24, 2023

(54) FULL REFERENCE VIDEO QUALITY MEASUREMENTS OF VIDEO CONFERENCING OVER THE CONGESTED NETWORKS

(71) Applicant: CHARTER COMMUNICATIONS OPERATING, LLC, St. Louis, CO (US)

(72) Inventors: Mun G Choi, Castle Pines, CO (US); Dhananjay Lal, Englewood, CO (US); Andrew Ip, Centennial, CO (US)

(73) Assignee: CHARTER COMMUNICATIONS OPERATING, LLC., St. Louis, MO (US)

( * ) Notice: Subject to any disclaimer, the term of this patent is extended or adjusted under 35 U.S.C. 154(b) by 0 days.

(21) Appl. No.: 17/495,400

(22) Filed: Oct. 6, 2021

(51) Int. Cl.
*H04L 65/75* (2022.01)
*H04L 65/80* (2022.01)
*H04L 12/18* (2006.01)
*H04L 65/70* (2022.01)

(52) U.S. Cl.
CPC .......... *H04L 65/80* (2013.01); *H04L 12/1827* (2013.01); *H04L 65/70* (2022.05); *H04L 65/75* (2022.05)

(58) Field of Classification Search
CPC ... H04L 65/80; H04L 12/1827; H04L 65/601; H04L 65/607
See application file for complete search history.

(56) References Cited

U.S. PATENT DOCUMENTS

| | | | | |
|---|---|---|---|---|
| 9,854,020 | B1* | 12/2017 | Kum | H04N 21/8456 |
| 10,484,446 | B1* | 11/2019 | Waggoner | H04N 21/6373 |
| 11,089,359 | B1* | 8/2021 | Katsavounidis | H04N 21/4621 |
| 2007/0237227 | A1* | 10/2007 | Yang | H04N 19/132 375/E7.181 |
| 2009/0262244 | A1* | 10/2009 | Buttimer | G09G 5/008 348/572 |
| 2015/0341667 | A1* | 11/2015 | Liao | H04N 19/86 375/240.27 |
| 2020/0059652 | A1* | 2/2020 | Brice | H04N 19/176 |

OTHER PUBLICATIONS

Yen-Fu Ou et al., "Q-Star: A Perceptual Video Quality Model Considering Impact of Spatial, Temporal, and Amplitude Resolutions", IEEE Transactions on Image Processing (vol. 23, Issue: 6, pp. 2473-2486), Jun. 2014.*

* cited by examiner

*Primary Examiner* — Oanh Duong
(74) *Attorney, Agent, or Firm* — Meagher Emanuel Laks Goldberg & Liao, LLP

(57) ABSTRACT

Various embodiments comprise systems, methods, and apparatus for processing a received video stream according to an embodiment comprises: identifying a number of repeated video frames within a sequence of N video frames within the video stream; determining, using a video frame quality assessment mechanism adapted to use repeated frames information, a motion adapted video quality metric (VQM) of the sequence of N video frames; and generating an alarm in response to the motion adapted VQM being less than a threshold level.

20 Claims, 2 Drawing Sheets

FULL REFERENCE VIDEO QUALITY MEASUREMENTS OF VIDEO CONFERENCING OVER THE CONGESTED NETWORKS

FIELD OF THE DISCLOSURE

The present disclosure generally relates to video quality measurement and, more particularly, to measuring or characterizing video quality of video conferencing over a congested network.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Video streams associated with video conferencing platforms/servers (e.g., WebEx, Zoom, MS Teams, and the like) receive participant video streams via respective uplinks, and combine/transcode the received participant video streams for transmission to the participants via one or more downlinks. Local (participant) processing of received video stream(s) may be employed by a video conferencing client instantiated at a recipient's device, such as a mobile phone, laptop, and the like. Such local processing may comprise local selection of views of other participant, view formatting, and the like. Network congestion may cause video packets to be discarded. It is important to understand the effect of network congestion within video conferencing systems and the like so as to manage network operations as well as consumer expectations associated applications depending on such network operations.

SUMMARY

Various deficiencies in the prior art are addressed by systems, methods, and apparatus for determining a video quality metric (VQM) assessing both spatial and temporal characteristics associated with video streams subjected to packet loss due to network congestion, transcoding errors/limitations, decoding noise, and/or other causes. For example, various embodiments provide a VQM tool configured to determine a spatial-temporal VQM associated with one or more video streams received by a client of video conferencing application (or other application) so as to determine if a minimum quality of experience (QoE) is being delivered to a video conference participant (or video stream recipient of some other application).

The spatial-temporal VQM determinations may be used by a network manager or other entity to adapt various link/path transmission parameters in real time to ensure the appropriate QoE is provided.

The spatial-temporal VQM determinations may be used by a network manager or other entity to characterize the impact on QoE of packet loss due to network congestion, transcoding errors/limitations, decoding noise, and/or other causes for specific types of applications delivering video to clients (e.g., video conferencing, live multimedia content streaming, television broadcast delivery, video on demand, and so on), or different applications of a specific type (e.g., different video conferencing platforms/applications such WebEx, Zoom, Skype, and the like).

A computer implemented method of processing a received video stream according to an embodiment comprises: identifying a number of repeated video frames within a sequence of N video frames within the video stream; determining, using a video frame quality assessment mechanism adapted to use repeated frames information, a motion adapted video quality metric (VQM) of the sequence of N video frames; and generating an alarm in response to the motion adapted VQM being less than a threshold level.

A system according to an embodiment may comprise one or more computer processors; and memory storing program instructions that are executed by the one or more processors to implement a video quality analyzer configured for: identifying a number of repeated video frames within a sequence of N video frames within the video stream; determining, using a video frame quality assessment mechanism adapted to use repeated frames information, a motion adapted video quality metric (VQM) of the sequence of N video frames; and generating an alarm in response to the motion adapted VQM being less than a threshold level.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
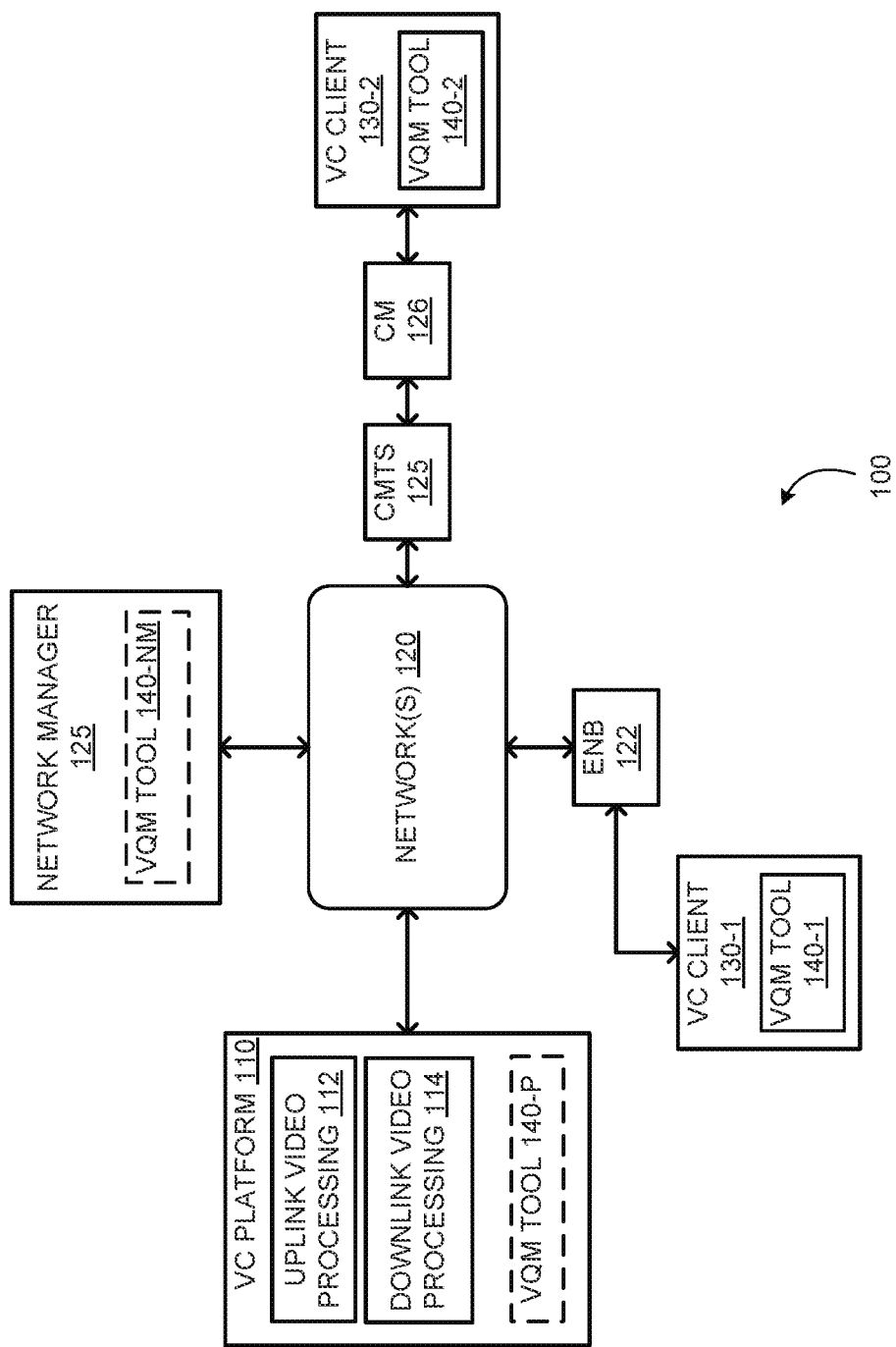
FIG. 1 depicts a block diagram of a video stream delivery architecture useful in describing the various embodiments.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various embodiments comprise systems, methods, and apparatus for determining a video quality metric (VQM) assessing both spatial and temporal characteristics associated with video streams subjected to packet loss due to network congestion, transcoding errors/limitations, decoding noise, and/or other causes. For example, various embodiments provide a VQM tool configured to determine a spatial-temporal VQM associated with one or more video streams received by a client of video conferencing application (or other application) so as to determine if a minimum quality of experience (QoE) is being delivered to a video conference participant (or video stream recipient of some other application).

The spatial-temporal VQM determinations may be used by a network manager or other entity to adapt various link/path transmission parameters in real time to ensure the appropriate QoE is provided.

The spatial-temporal VQM determinations may be used by a network manager or other entity to characterize the impact on QoE of packet loss due to network congestion, transcoding errors/limitations, decoding noise, and/or other causes for specific types of applications delivering video to clients (e.g., video conferencing, live multimedia content streaming, television broadcast delivery, video on demand, and so on), or different applications of a specific type (e.g., different video conferencing platforms/applications such as WebEx, Zoom, Skype, and the like). The VQM tool may operate in an application agnostic manner with respect to the source of the video stream to be assessed, such as a video stream received by a client device participating in a video conference (VC) via a particular VC platform/application, or via a VC platform/application or other video source outside of the client's local access network vs within the client's local access network.

FIG. 1 depicts a block diagram of a video stream delivery architecture useful in describing the various embodiments. Specifically, the video stream delivery architecture 100 of FIG. 1 is depicted as a video conferencing (VC) architecture wherein a video conferencing platform or server 110 provides video conferencing services to a plurality of VC clients 130 operatively coupled to one or more networks 120.

The video conference platform or server 110 may comprise any of a number of commercially available video conferencing platforms/servers, such as those supporting WebEx, Zoom, MS Teams, and/or other video conferencing applications. The video conference platform or server 110 generally includes modules for uplink video processing 112 and downlink video processing 114 to receive participant video streams via respective uplinks, and to combine/transcode the received participant video streams for transmission to the participants via one or more downlinks. Local (participant) processing of received video stream(s) may be employed by video conferencing clients 130 instantiated at recipient devices, such as a mobile phones, laptops, and the like. Such local processing may comprise local selection of views of other participants, view formatting, and the like.

As depicted in FIG. 1, one or more networks 120 support communications between the video conference platform or server 110 and various VC clients 130. The network(s) 120 may comprise, illustratively, one or more of an access network or core network delivering services to user equipment (UE) such as client devices 130 via a mobile network, a fixed wireless network, or some other network topology or combination of network topologies.

As depicted in FIG. 1, a first VC client 130-1 comprises a mobile device communicating with the network(s) 120 via an eNB 122 using mobile network protocols such as 3G, 4G/LTE, 5G and the like, and a second VC client 130-2 comprises a device communicating with the network(s) 120 via a cable modem (CM) 126 and cable modem termination system (CMTS), such as via a cable television operator or Multiple Service Operator (MSO) using the Data Over Cable Service Interface Specification (DOCSIS).

As depicted in FIG. 1, a network manager 125 is operatively coupled to the network(s) 120 for managing provider equipment (PE) elements therein.

As depicted in FIG. 1, one or more of the VC platform 110, VC clients 130, and network manager 125 may include or have associated with it a respective video quality measurement (VQM) tool 140 configured in accordance with the various embodiments. Each VQM tool 140 is configured to selectively process locally received video streams to determine respective video quality metrics (VQMs) assessing both spatial and temporal characteristics, such characteristics being influenced by packet loss due to network congestion, transcoding errors/limitations, decoding noise, and/or other causes.

In the VC scenario of FIG. 1, the video conference platform or server 110 supports video conferencing between multiple clients, illustratively the first 130-1 and second 130-2 VC clients 130. At each of the VC clients 130, local video is captured, encoded, and transmitted toward the VC platform 110 via respective uplink communications paths including the network(s) 120 and client 130 connections thereto. The VC platform 110 processes received client video streams and transmits a combined or conferenced video stream to each of the clients 130 via respective downlink communications paths including the network(s) 120 and respective client 130 connections thereto.

Congestion in the network(s) 120 may cause uplink or downlink video packets and even entire video frames to be discarded, resulting in intra-frame (spatial) artifacts such as missing macroblocks and/or and inter-frame (motion) image artifacts such as jerkiness.

In various embodiments, a VQM tool 140 associated with a video receiving entity (e.g., VC client 130, VC platform 110, or network manager 125) is configured to determine a spatial-temporal VQM associated with one or more video streams received thereat.

It is noted that various elements or portions thereof depicted in FIG. 1 and having functions described herein are implemented at least in part as computing devices having communications capabilities, including for example VC platform 110, network manager 125, VC clients 130, VQM tools 140, and/or various portions or elements thereof, as well as various portions of the network(s) 120 and access means thereto. These elements or portions thereof are implemented or instantiated via computing devices of various types, though generally a processor element (e.g., a central processing unit (CPU) or other suitable processor(s)), a memory (e.g., random access memory (RAM), read only memory (ROM), and the like), various communications interfaces (e.g., more interfaces enabling communications via different networks/RATs), input/output interfaces (e.g., GUI delivery mechanism, user input reception mechanism, web portal interacting with remote workstations and so on) and the like.

For example, various embodiments are implemented using network services provider equipment comprising processing resources (e.g., one or more servers, processors and/or virtualized processing elements or compute resources) and non-transitory memory resources (e.g., one or more storage devices, memories and/or virtualized memory elements or storage resources), wherein the processing resources are configured to execute software instructions stored in the non-transitory memory resources to implement thereby the various methods and processes described herein. The network services provider equipment may also be used to provide some or all of the various other functions described herein.

As such, the various functions depicted and described herein may be implemented at the elements or portions thereof as hardware or a combination of software and hardware, such as by using a general purpose computer, one or more application specific integrated circuits (ASIC), or any other hardware equivalents or combinations thereof. In various embodiments, computer instructions associated with a function of an element or portion thereof are loaded into a respective memory and executed by a respective processor to implement the respective functions as discussed herein. Thus various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

As an example, a video conference application (e.g., WebEx) may utilize client generated uplink video streams of 1080p resolution and 30 fps frame rate, which are processed by the VC platform 110 to provide 1080p 10 fps downlink video streams for presentation at the clients 130. Therefore, for each 600 video stream uplink frames, a video conference participant should receive 200 video stream downlink frames. As congestion in the network(s) 120 increases, the likelihood of dropped packets or frames from video streams transported therethrough increases. When a frame is dropped, the frame preceding the dropped frame is used instead (e.g., for presentation, transcoding, etc.), resulting in jerkiness and other motion artifacts.

In various embodiments, a VQM tool 140 operates to search a received video stream to identify dropped frames, and to apply a frame drop-compensated VQM methodology to the video stream to determine a spatial-temporal VQM associated with the video stream.

Visual Information Fidelity (VIF)

Visual Information Fidelity (VIF) is a full reference image quality assessment index based on natural scene statistics and the notion of image information extracted by the human visual system. While useful, it is limited. Specifically, VIF is used as a means of assessing visual quality and it is measured with respect to a reference video. VIF measures the fidelity of processing a video image sequence. Both the original and processed video images are needed and must be aligned spatially and temporally for this differential comparison.

Specifically, for a received video stream, assume that $f=(f_1, f_2, \ldots, f_N)$ is the video input sequence that has N frames and these N frames are the reference frames of full reference video quality measurement. Let $f_i$ define the $i^{th}$ frame and N frames are sent to the video conferencing server, but the receiver at one participant receives only M frames because of the frame drops (i.e., N>M) caused by the video conferencing application's transcoding and network congestions, and the received video is defined by $g=(g_1, g_2, \ldots, g_M)$.

Since frame drops are randomly occurring, the reference frame $f_i$ is not matched with the reference frame $g_i$. Therefore, each $g_i$ finds the best matched reference frame $\hat{f}_i$ among $(f_1, f_2, \ldots, f_N)$ using the full search method. The best matched reference video is defined by $\hat{f}=(\hat{f}_1, \hat{f}_2, \ldots, \hat{f}_M)$. Let VIF between $\hat{f}_i$ and $g_i$ define $VIF_i=VIF(\hat{f}_i,g_i)$. The average of VIF value is given by:

$$VIF(\hat{f}, g) = \frac{1}{M}\sum_{i=1}^{M} VIF(\hat{f}_i, g_i) \quad \text{(Eq. 1)}$$

In a full-reference VQM, an original undistorted high-quality video is compared to a degraded version of the same video, for example, pixel by pixel. During interactive communication such as chatting, the full-reference VQM is not possible because the reference video can't be captured. However, the video content sharing can achieve the full-reference VQM of video conferencing.

Motion Adaptive VIF

Various embodiments improve upon the VIF methodology to provide a motion adaptive VIF methodology for determining a spatial-temporal VQM associated with a video conference video stream. Specifically, assuming that frame drops are randomly occurring during video stream transmission, a spatial-temporal VQM associated with a video conference video stream me be determined as follows, where $VIF_i$ is the VIF value of $i^{th}$ frame, and M are the actual received frame numbers before frame repeats at the video conference participant and N are the frame numbers after video conference server transcoding:

$$VIF_{MA}(\hat{f}, g) = \sqrt{\frac{\sum_{i=1}^{M} VIF_i^2(\hat{f}_i, g_i)}{N}} \quad \text{(Eq. 2)}$$

Many video conference client apps such as WebEx, Zoom, Skype, and the like, apply the frame repeat option in the decoding process when the packet drops are occurred during the packet transmissions through the networks. Thus, after transcoding received client streams the video conferencing server transmits N video frames toward the video conference client apps (participants), and the video conference client apps decode and display N video frames even though N-M frames may have been dropped. The insertion into the client app presentation of N-M frame repeats produces a degradation of temporal video quality (e.g., motion jerkiness) while the spatial video quality is maintained.

Motion Adaptive VQM

The motion adaptive VIF methodology of eq. 2 provides a mechanism for determining a spatial-temporal VQM associated with a video stream by adapting the VIF image quality assessment mechanism to the particular concerns of the various embodiments. It is noted that a spatial-temporal VQM according to various embodiments may be generated using other image quality assessment mechanisms alone or in any combination, as Video Multimethod Assessment Fusion (VMAF), Structural Similarity (SSIM), Multi-Scale Structural Similarity (MS-SSIM), peak signal-to-noise ratio (PSNR) and the like.

Generally speaking, a spatial-temporal VQM may be based on the spatial VQM methods such as VIF, VMAF, SSIM, MS-SSIM, PSNR, and/or another image quality measurement mechanisms or video frame quality assessment mechanisms. Specifically, assuming that frame drops are randomly occurring during video stream transmission, a spatial-temporal VQM associated with a video conference video stream may be determined as follows, where $VQM_i$ is the value of $i^{th}$ frame according to the selected video frame quality assessment mechanism, and M are the received frame numbers at the video conference participant and the client app repeats N-M frames and N are the frame numbers after video conference serve transcoding:

$$VQM_{MA}(\hat{f}, g) = \sqrt{\frac{\sum_{i=1}^{M} VQM_i^2(\hat{f}_i, g_i)}{N}} \quad (Eq. 3)$$

The above eq. 3 contemplates that the spatial-temporal VQM (motion adapted VQM) of a video stream will be the same as the spatial VQM of that stream if there are no frames dropped (i.e., N=M), with the spatial-temporal VQM degrading as the number of received frames M gets smaller and smaller with respect to the total number of frames transcoded or encoded by the transmitting entity (e.g., the VC platform or server 110).

Various embodiments are directed to generating a spatial-temporal VQM associated with a received video stream at a VC client 130 and taking action based upon that number. For example, if the spatial-temporal VQM associated with a received video stream at a VC client 130 is below a guaranteed value, then a client account may receive a credit, an alarm or warning may be generated by the client for use by the network manager, or some other action may be taken.

Various embodiments contemplate that the VC client calculates the spatial-temporal VQM and transmits the calculated value to the network manager 125 or VC platform 110.

Various embodiments contemplate that the VC client calculates the spatial-temporal VQM and transmits the calculated value to the network manager 125 or VC platform 110.

Figure 2:
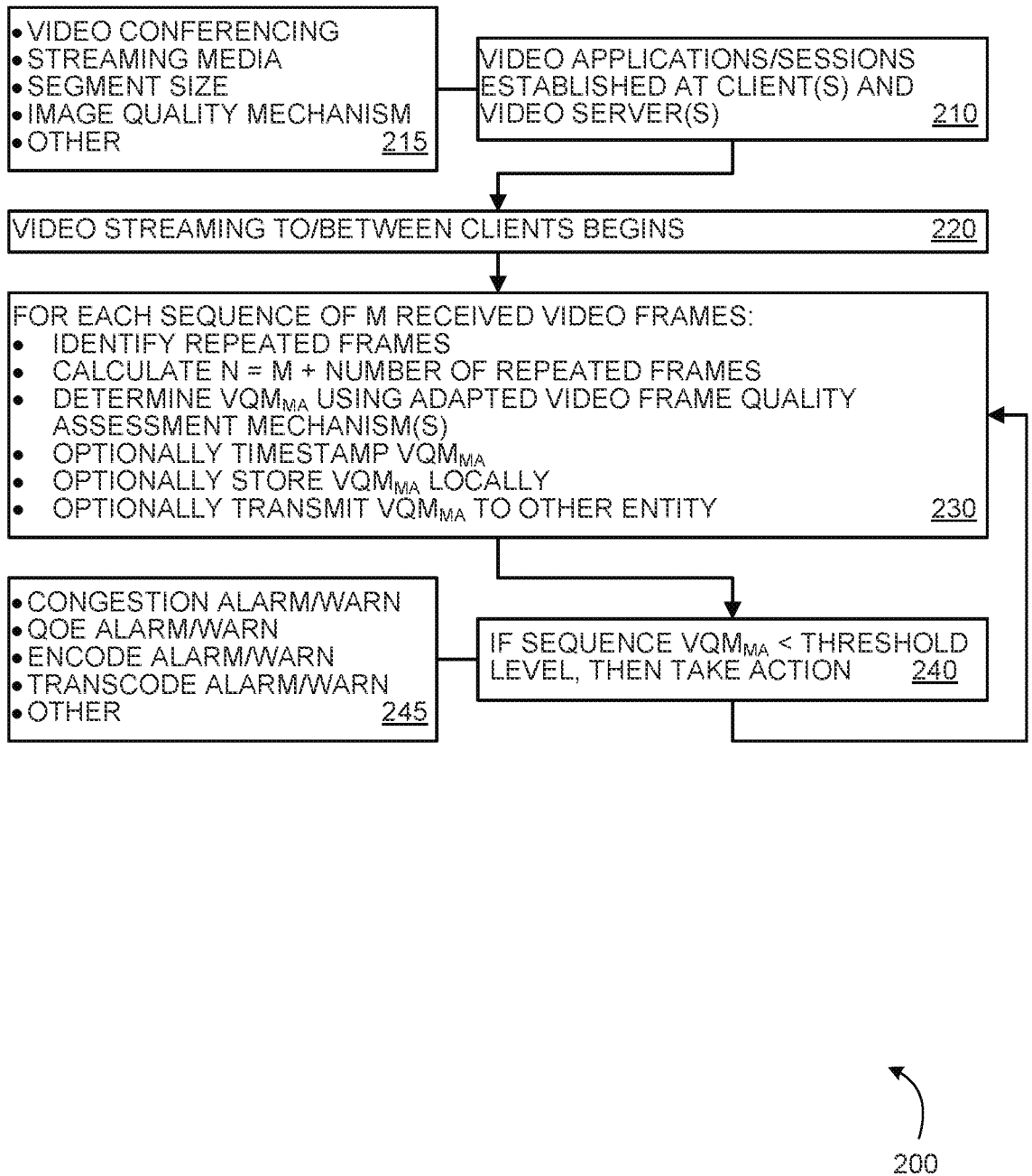
FIG. 2 depicts a flow diagram of a method according to an embodiment.

FIG. 2 depicts a flow diagram of a video stream processing method according to an embodiment. Specifically, FIG. 2 depicts a method 200 of segment by segment processing of a received video stream, where each segment comprises a predefined number (N) of frames within a sequence of frames, wherein a respective spatial-temporal VQM (motion adapted VQM) is determined for each segment.

At step 210, a video application or session is established between one or more clients and a content delivery server, video conferencing server, or other device configured to transmit a video stream to a client device. Referring to box 215, application/session may comprise video conferencing, streaming media (live, on-demand and the like), of other video/media.

Further, a video segment size N is selected if needed (e.g., may be predetermined based upon application or video stream parameters such as encoding parameters). N may be selected with respect to time (e.g., number of frames per second or portion thereof, such as N=30 for 1 second of video at 30 fps or 3 seconds of video at 10 fps), with respect to group of frames (GOF) or group of pictures (GOP) structure (e.g., N=15 for a 15 frame GOF/GOP structure), or with respect to some other criteria. Generally speaking, N may be selected as a number of frames associated with a predetermined presentation time associated with the video stream, such as one second, a half second, an integer multiple of one second or a half second, or some other amount of video presentation time.

It is noted the N may be held constant for each of a plurality of video stream segments to be assessed by the embodiments, or N may vary. For example, N may vary when the video stream being assessed changes in terms of frame rate or other temporal characteristic, GOF/GOP size or other encoding characteristic, limitation on processing or memory resources at the device performing a video stream assessment, and so on.

Further, an image quality mechanism for use in calculating spatial-temporal VQM (motion adapted VQM) for some or all of the segments is selected. For purposes of this discussion, it will be assumed that a video conference is established between a plurality of VC clients 103 as described above with respect to FIG. 1.

At step 220, video streaming to and/or between client devices begins.

As step 230, for each sequence of M received video frame (e.g., at a client device 130) and the video conference client app repeats N-M frames during the decoding processes, the number of repeated frames is identified so as to indicate thereby the number of dropped frames, Nis equal to M+ the number of repeated (dropped) frames, and the spatial-temporal VQM (motion adapted VQM) of the segment $VQM_{MA}$ is determined such as in accordance with eq. 3. In particular, the segment $VQM_{MA}$ is determined using a video frame quality assessment mechanism adapted to use repeated frames information to provide thereby a motion adapted video quality metric (VQM) of the sequence of N video frames. One or more of various video frame quality assessment mechanisms such as discussed herein may be adapted for this purpose.

Optionally, the calculated segment $VQM_{MA}$ is time-stamped, stored locally (e.g., at the client 130), and/or transmitted toward another entity (e.g., network manager 125 and/or VC platform 110).

At step 240, if the calculated segment $VQM_{MA}$ is less than a threshold level (e.g., a level indicative of sufficient/ acceptable QoE), then action is taken. Referring to box 245, the action taken may comprise generating a congestion or network related alarm or warning, generating a QoE related alarm or warning, generating an encoder/transcoder related alarm or warning, or taking some other action.

In various embodiments, the generated alarm/warning is transmitted to another entity for processing, such as the network manager 125 and/or VC platform 110.

In various embodiments, the generated alarm/warning is configured to cause the entity to which the alarm/warning is transmitted to modify its operation, such as by reducing network congestion associate with the client transmitting the alarm/warning, modifying the encoding/transcoding of video transmitted toward the client, adjusting an account associated with the subscriber associated with the client transmitting the alarm/warning, and so on.

The spatial-temporal VQM associated with the video stream may be used to determine if a minimum quality of experience (QoE) is being delivered to a video conference participant (or video stream recipient of some other application).

The spatial-temporal VQM determinations may be used by a network manager or other entity to adapt various link/path transmission parameters in real time to ensure the appropriate QoE is provided.

The spatial-temporal VQM determinations may be used by a network manager or other entity to characterize the impact on QoE of packet loss due to network congestion, transcoding errors/limitations, decoding noise, and/or other causes for specific types of applications delivering video to clients (e.g., video conferencing, live multimedia content streaming, television broadcast delivery, video on demand, and so on), or different applications of a specific type (e.g., different video conferencing platforms/applications such WebEx, Zoom, Skype, and the like). The VQM tool may operate in an application agnostic manner with respect to the source of the video stream to be assessed, such as a video stream received by a client device participating in a video conference (VC) via a particular VC platform/application, or via a VC platform/application or other video source outside of the client's local access network vs within the client's local access network.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A computer implemented method of processing a received video stream, comprising:

identifying a number of repeated video frames within a sequence of N video frames within the video stream, where N is an integer greater than 1;

determining, using a video frame quality assessment mechanism adapted to use repeated frames information, a motion adapted (MA) video quality metric (VQM) of the sequence of N video frames; and generating an alarm in response to the motion adapted VQM being less than a threshold level;

wherein said motion adapted VQM of the sequence of N video frames is calculated as:

$$VQM_{MA}(\hat{f}, g) = \sqrt{\frac{\sum_{i=1}^{M} VQM_i^2(\hat{f}_i, g_i)}{N}},$$

wherein N is a number of video frames within a video frame sequence f, and M is a number of video frames within a received video frame sequence g.

2. The method of claim 1, wherein the method is repeated for each of a plurality of video stream segments within the video stream.

3. The method of claim 2, wherein each of the video stream segments comprises a respective sequence of N video frames.

4. The method of claim 1, further comprising transmitting the alarm toward a network manager, the alarm configured to cause the network manager to reduce congestion on at least one link associated with the received video stream.

5. The method of claim 1, further comprising transmitting the alarm toward a server, the alarm configured to cause the server to adjust encoding or transcoding associated with the received video stream.

6. The method of claim 1, wherein the video frame quality assessment mechanism comprises a Visual Information Fidelity (VIF) assessment mechanism.

7. The method of claim 1, wherein the video frame quality assessment mechanism comprises a Video Multimethod Assessment Fusion (VMAF) assessment mechanism.

8. The method of claim 1, wherein the video frame quality assessment mechanism comprises one of a Structural Similarity (SSIM) and a Multi-Scale Structural Similarity (MS-SSIM) assessment mechanism.

9. The method of claim 1, wherein the video frame quality assessment mechanism comprises a peak signal-to-noise ratio (PSNR) assessment mechanism.

10. The method of claim 1, wherein N is selected as a number of frames within a group of frames (GOF) or group of pictures (GOP) structure used to encode the video stream.

11. The method of claim 1, wherein N is selected as a number of frames associated with a predetermined presentation time associated with the video stream.

12. The method of claim 11, wherein N is selected as a number of frames associated with one second of presentation time of the video stream.

13. The method of claim 11, wherein N is selected as a number of frames associated with an integer multiple of one half second of presentation time of the video stream.

14. A system, comprising:
one or more computer processors; and
memory storing program instructions that are executed by the one or more processors to implement a video quality analyzer configured for:
identifying a number of repeated video frames within a sequence of N video frames within the video stream, where N is an integer greater than 1;
determining, using a video frame quality assessment mechanism adapted to use repeated frames information, a motion adapted (MA) video quality metric (VQM) of the sequence of N video frames; and
generating an alarm in response to the motion adapted VQM being less than a threshold level;
wherein said motion adapted VQM of the sequence of N video frames is calculated as:

$$VQM_{MA}(\hat{f}, g) = \sqrt{\frac{\sum_{i=1}^{M} VQM_i^2(\hat{f}_i, g_i)}{N}},$$

wherein N is a number of video frames within a video frame sequence f, and M is a number of video frames within a received video frame sequence g.

15. The system of claim 14, wherein the video quality analyzer is further configured for processing each of a plurality of video stream segments within the video stream.

16. The system of claim 14, wherein the video quality analyzer is further configured for transmitting the alarm toward a network manager, the alarm configured to cause the network manager to reduce congestion on at least one link associated with the received video stream.

17. The system of claim 14, wherein the video quality analyzer is further configured for transmitting the alarm toward a server, the alarm configured to cause the server to adjust encoding or transcoding associated with the received video stream.

18. The system of claim 14, wherein the video frame quality assessment mechanism comprises one of a Visual Information Fidelity (VIF) assessment mechanism and a Video Multimethod Assessment Fusion (VMAF) assessment mechanism.

19. The system of claim 14, wherein the video frame quality assessment mechanism comprises one of a Structural Similarity (SSIM) and a Multi-Scale Structural Similarity (MS-SSIM) assessment mechanism.

20. A computer implemented video quality analyzer for qualitatively assessing received video streams comprising non-transitory compute and memory resources configured for:
identifying a number of repeated video frames within a sequence of N video frames within a video stream, where N is an integer greater than 1;
determining, using a video frame quality assessment mechanism adapted to use repeated frames information, a motion adapted (MA) video quality metric (VQM) of the sequence of N video frames; and
generating an alarm in response to the motion adapted VQM being less than a threshold level;
wherein said motion adapted VQM of the sequence of N video frames is calculated as:

$$VQM_{MA}(\hat{f}, g) = \sqrt{\frac{\sum_{i=1}^{M} VQM_i^2(\hat{f}_i, g_i)}{N}},$$

wherein N is a number of video frames within a video frame sequence f, and M is a number of video frames within a received video frame sequence g.

* * * * *